(12) United States Patent
Kikuchi et al.

(10) Patent No.: US 10,171,737 B2
(45) Date of Patent: Jan. 1, 2019

(54) IMAGING DEVICE

(71) Applicant: Panasonic Intellectual Property Management Co., Ltd., Osaka (JP)

(72) Inventors: Fumitaka Kikuchi, Osaka (JP); Koji Yasuda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/496,583

(22) Filed: Apr. 25, 2017

(65) Prior Publication Data
US 2018/0103205 A1  Apr. 12, 2018

(30) Foreign Application Priority Data

Oct. 6, 2016 (JP) .................................. 2016-197741
Feb. 3, 2017 (JP) .................................. 2017-018152

(51) Int. Cl.
*H04N 5/232* (2006.01)

(52) U.S. Cl.
CPC .............................. *H04N 5/23258* (2013.01)

(58) Field of Classification Search
CPC .................... H04N 5/23258; H04N 5/2254
See application file for complete search history.

(56) References Cited

U.S. PATENT DOCUMENTS

| 7,830,416 | B2 * | 11/2010 | Tanaka | G03B 5/02 |
| | | | | 348/208.6 |
| 8,238,736 | B2 * | 8/2012 | Tsuruta | G02B 7/022 |
| | | | | 348/208.99 |
| 2002/0125795 | A1 * | 9/2002 | Mori | G01C 19/5663 |
| | | | | 310/354 |

FOREIGN PATENT DOCUMENTS

| JP | 2008-203314 A | 9/2008 |
| JP | 2008-216570 A | 9/2008 |
| JP | 2009-251492 A | 10/2009 |
| JP | 2013-160898 A | 8/2013 |

* cited by examiner

*Primary Examiner* — Padma Haliyur
(74) *Attorney, Agent, or Firm* — Renner Otto Boisselle & Sklar, LLP

(57) ABSTRACT

An imaging device includes: a shake detection unit that holds a gyro sensor inside the shake detection unit; a first sheet metal and a second sheet metal that sandwich the shake detection unit in two facing directions; a first cushion member that abuts on the first sheet metal and faces the shake detection unit via the first sheet metal; and a second cushion member that abuts on the second sheet metal and faces the shake detection unit via the second sheet metal.

7 Claims, 10 Drawing Sheets

IMAGING DEVICE

BACKGROUND

1. Technical Field

The present disclosure relates to an imaging device with a camera shake correction function that mounts a shake detection unit. Particularly, the present disclosure relates to a holding configuration of the shake detection unit.

2. Description of Related Art

Conventionally, there is an imaging device mounted with detection means for detecting a shake of the device (a gyro sensor or the like). In case of a lens interchangeable type camera, the detection means for detecting the shake of the imaging device (the gyro sensor or the like) is provided in at least one of an interchangeable lens and a camera body (for example, see Unexamined Japanese Patent Publication No. 2009-251492).

SUMMARY

An imaging device according to the present disclosure includes: a shake detection unit that holds a gyro sensor; a first sheet metal and a second sheet metal that sandwich the shake detection unit in two facing directions; a first cushion member that abuts on the first sheet metal and faces the shake detection unit via the first sheet metal; and a second cushion member that abuts on the second sheet metal and faces the shake detection unit via the second sheet metal.

The imaging device according to the present disclosure is effective in suppressing erroneous detection of a vibration due to a disturbance, such as a shock, to accurately detect a camera shake.

DETAILED DESCRIPTION

Figure 1:
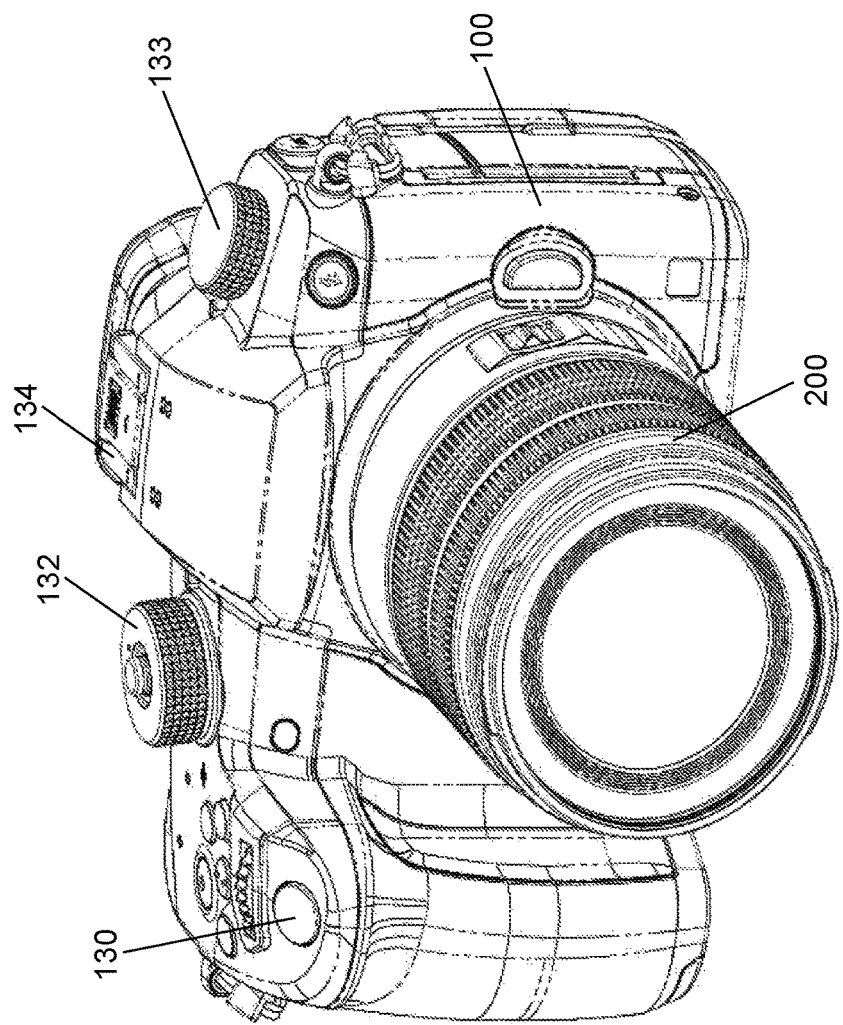
FIG. 1 is a perspective view showing an external appearance of a digital camera according to a first exemplary embodiment.

Hereinafter, an exemplary embodiment is described in detail by appropriately referring to the drawings.

It is necessary to configure a shake detection system, a control system, and a shake correction drive system to correct a camera shake of a digital camera. The present exemplary embodiment relates to a holding configuration of a shake detection unit in the shake detection system.

First Exemplary Embodiment

An imaging device provided with a mechanism that corrects camera shakes around five axes (a camera shake correction mechanism) has appeared in recent years. Since a gyro sensor plays a central role in the camera shake correction mechanism, the gyro sensor is required to have a high sensitivity level. However, an increase in the sensitivity causes the gyro sensor to be very sensitive to disturbance. Accordingly, the imaging device has a problem in that the gyro sensor erroneously detects disturbance other than the camera shake, such as a shutter shock, as the camera shake. In an imaging device in a first exemplary embodiment, a shake detection unit is sandwiched by cushion members and sheet metals in two facing directions. With this configuration, a vibration caused by the disturbance, such as the shutter shock, can be absorbed. Further, loads acting on the shake detection unit can be made uniform through the sheet metals. As a result, the erroneous detection of the camera shake is suppressed, and the camera shake can be detected accurately.

Hereinafter, the imaging device (a digital camera) of the first exemplary embodiment is described with reference to FIGS. 1 to 10.

1-1. EXTERNAL APPEARANCE OF DIGITAL CAMERA

FIG. 1 is a perspective view showing an external appearance of a digital camera according to the first exemplary embodiment.

The digital camera according to the present exemplary embodiment is a lens interchangeable type digital camera. A user can enjoy photography by mounting various kinds of interchangeable lenses 200 on a mount of camera body 100.

Release button 130 for instructing photography and operating members for performing various kinds of settings about the photography, such as mode dial 132 and drive dial 133, are disposed on an upper surface of the digital camera. Hot shoe 134 capable of mounting an external stroboscopic device or the like having a large amount of luminescence is provided on an upper part of the digital camera.

A liquid crystal monitor is disposed on a back surface of the digital camera. An image formed on an imaging element and based on incident light is displayed on the liquid crystal monitor.

Various kinds of operating buttons including a cross key and operating members, such as an operating dial, are disposed on the back surface of the digital camera. A user can perform advanced settings of photography, reproduction, or the like with these operating members. A slot capable of inserting a memory card is provided on a right side surface, as seen from the back surface of the digital camera.

1-2. CORRECTION FUNCTION OF DIGITAL CAMERA

A function of correcting a shake by shifting a lens for correction within interchangeable lens 200 is referred to as an "optical image stabilizer (OIS) function". Further, a function of correcting a shake by shifting an imaging element within camera body 100 is referred to as a "body image stabilizer (BIS) function".

Figure 2:
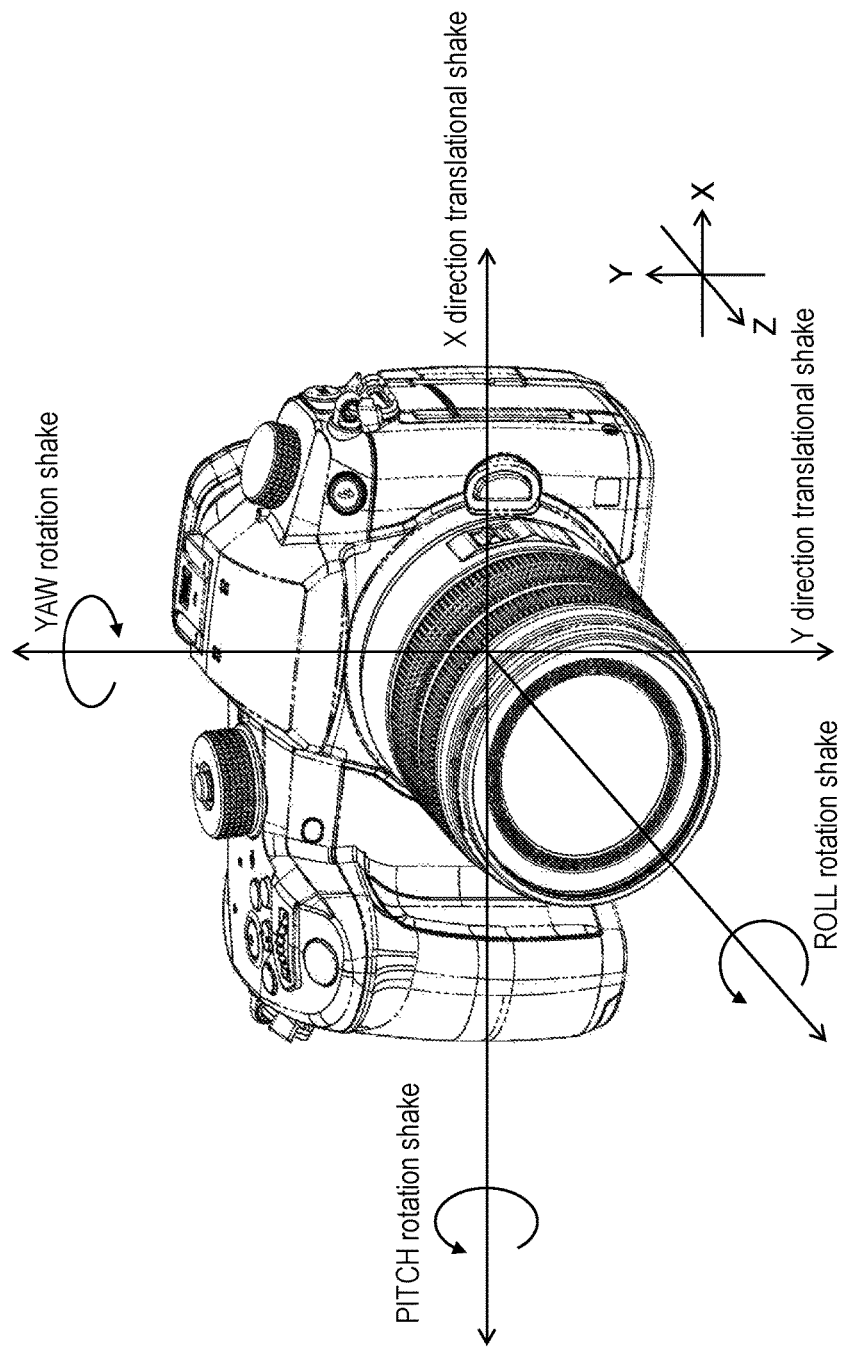
FIG. 2 is a view showing shakes of rotations (ROLL, PITCH, YAW) around three rotation axes and shakes translated to two axes of an X axis and a Y axis in the digital camera according to the first exemplary embodiment.

FIG. 2 is a view showing shakes due to rotations (ROLL, PITCH, YAW) around three rotation axes and shakes translated to two axes of an X axis and a Y axis in the digital camera according to the first exemplary embodiment. Shake correction is performed by using the BIS function on a total of five axes, i.e., the three rotation axes of the ROLL axis, the PITCH axis, and the YAW axis, and the two axes of the X axis and the Y axis.

The digital camera in the present exemplary embodiment can simultaneously control the OIS function (two-axis correction) and the BIS function (five-axis correction). For example, when a still image is photographed, the digital camera controls intelligently (changes a correction ratio between the OIS function and the BIS function) according to a focal distance or a photographing distance so as to obtain a maximum effect at each focal distance.

1-3. CONFIGURATION OF DIGITAL CAMERA

Figure 3:
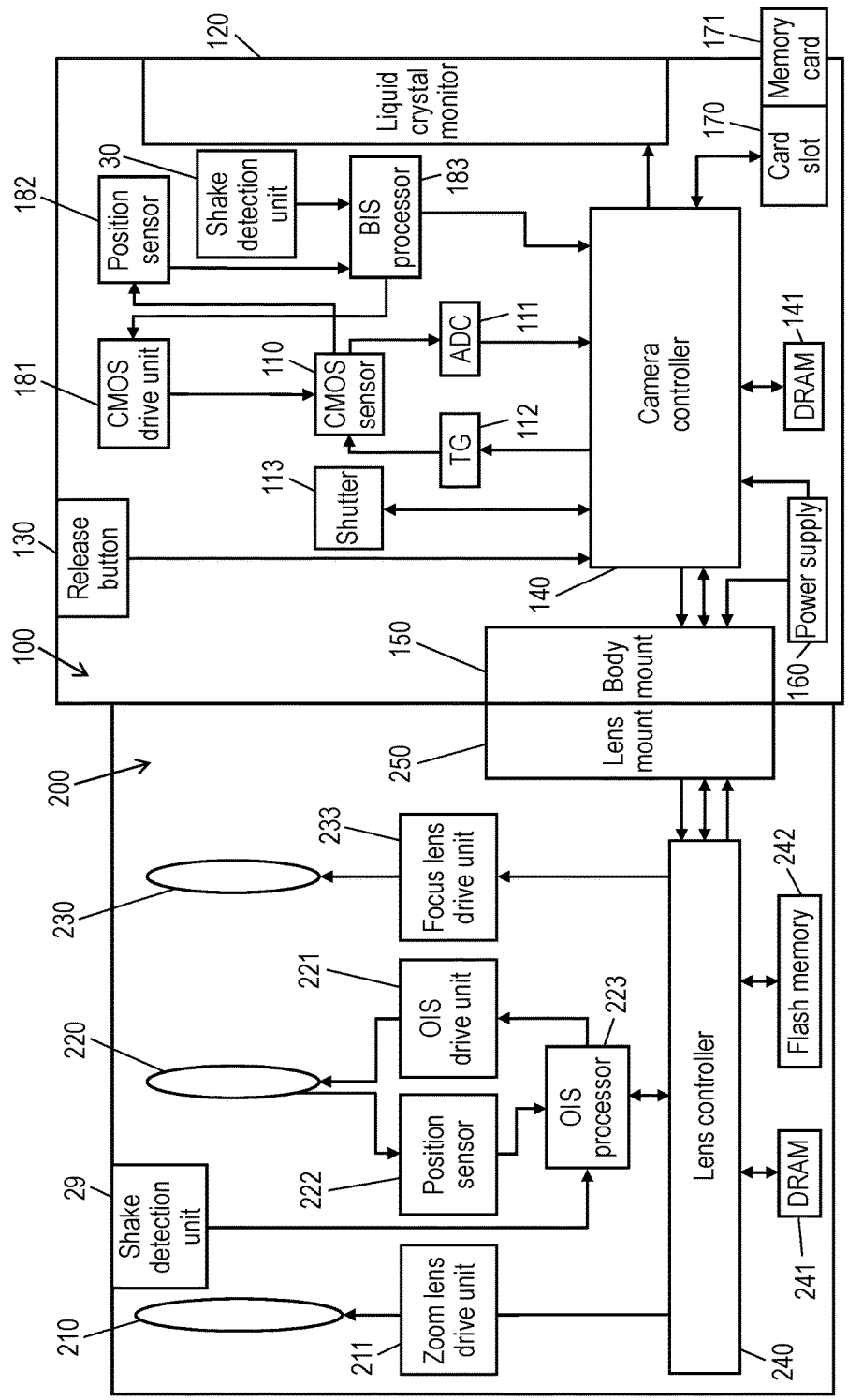
FIG. 3 is a block diagram showing a configuration of the digital camera according to the first exemplary embodiment.

FIG. 3 is a block diagram showing a configuration of the digital camera according to the first exemplary embodiment. The digital camera is configured with camera body 100 and interchangeable lens 200 detachable from camera body 100.

[1-3-1. Configuration of Camera Body]

Camera body 100 includes complementary metal oxide semiconductor (CMOS) sensor 110 serving as the imaging element, focal plane shutter 113, liquid crystal monitor 120, camera controller 140, body mount 150, power supply 160, and card slot 170.

Camera controller 140 controls components, such as CMOS sensor 110, according to an instruction from release button 130, thereby controlling operation of the entire digital camera. Camera controller 140 transmits a vertical synchronizing signal to timing generator 112. Camera controller 140 generates an exposure synchronizing signal in parallel with this transmission. Camera controller 140 periodically transmits the generated exposure synchronizing signal to lens controller 240 via body mount 150 and lens mount 250. Camera controller 140 uses dynamic random access memory (DRAM) 141 as a work memory during control operation or image processing operation.

CMOS sensor 110 images a subject image made incident via interchangeable lens 200 to generate image data. The generated image data is digitized by AD converter 111. The digitized image data is subjected to predetermined image processing by camera controller 140.

CMOS sensor 110 operates at timing controlled by timing generator 112. The operation of CMOS sensor 110 includes imaging operation of a still image, imaging operation of a through image, and the like. The through image is mainly a moving image, and is displayed on liquid crystal monitor 120 so that a user determines a composition for imaging a still image.

Focal plane shutter 113 is disposed on a front side (interchangeable lens 200 side) of CMOS sensor 110. Focal plane shutter 113 can be switched between a state of blocking light directed to CMOS sensor 110 from an optical system and a state of transmitting the light directed to CMOS sensor 110 from the optical system. Focal plane shutter 113 controls exposure time of CMOS sensor 110 by controlling opening time of the shutter. Focal plane shutter 113 includes physical curtains (for example, a front curtain and a rear curtain). When a still image or a moving image is photographed, the front curtain and the rear curtain are successively moved and stopped at predetermined places. The exposure time is a period of time since the front curtain is started to open until the rear curtain is stopped. When the front curtain and the rear curtain are stopped, the front curtain and the rear curtain make contact with a cushioning material inside a casing, thereby generating a shock. This shock is a shutter shock in the present exemplary embodiment. As the exposure is performed during the period of time since the front curtain is stopped to generate the shock until the rear curtain is stopped, the photography is continued. In other words, the photography is performed when a vibration caused by the shutter shock is generated.

Liquid crystal monitor 120 displays an image represented by image data for display subjected to the image processing by camera controller 140. Liquid crystal monitor 120 can selectively display the moving image and the still image.

Card slot 170 can be mounted with memory card 171, and controls memory card 171 based on control from camera controller 140. Digital camera 1 can store the image data in memory card 171 or read the image data from memory card 171.

Power supply 160 supplies electric power to the respective components within camera body 100.

Body mount 150 can be mechanically and electrically connected with lens mount 250 of interchangeable lens 200. Camera body 100 and interchangeable lens 200 can transmit and receive data via connectors installed in body mount 150 and lens mount 250. Body mount 150 transmits the exposure synchronizing signal received from camera controller 140 to lens controller 240 via lens mount 250. Further, body mount 150 transmits another control signal received from camera controller 140 to lens controller 240 via lens mount 250. Further, body mount 150 transmits a signal received from lens controller 240 to camera controller 140 via lens mount 250. Further, body mount 150 supplies the electric power from power supply 160 to entire interchangeable lens 200 via lens mount 250.

Also, as a configuration to realize the BIS function (the function of correcting the camera shake by shifting CMOS sensor 110), camera body 100 further includes shake detection unit 30 (shake detection means) that detects the shake of camera body 100 and BIS processor 183. BIS processor 183 generates a shake correction signal to control shake correction processing based on a detection result of shake detection unit 30.

Moreover, camera body 100 includes CMOS drive unit 181 that moves CMOS sensor 110 and position sensor 182 that detects a position of CMOS sensor 110. CMOS drive unit 181 can be realized, for example, by a magnet and a flat coil. Position sensor 182 is a sensor that detects the position of CMOS sensor 110 in a plane vertical to an optical axis of the optical system. Position sensor 182 can be realized, for example, by the magnet and a Hall element. BIS processor 183 controls CMOS drive unit 181 based on a signal from shake detection unit 30 and a signal from position sensor 182. Then, BIS processor 183 shifts CMOS sensor 110 in the plane vertical to the optical axis so as to cancel the shake of camera body 100. Further, another actuator, such as a stepping motor or an ultrasonic motor, may be used for CMOS drive unit 181.

[1-3-2. Configuration of Interchangeable Lens]

Interchangeable lens 200 includes the optical system, lens controller 240, and lens mount 250. The optical system includes zoom lens 210, OIS (Optical Image Stabilizer) lens 220, and focus lens 230.

Zoom lens 210 is a lens for changing magnification of a subject image formed in the optical system. Zoom lens 210 is configured with one or more lenses. Zoom lens drive unit 211 includes a zoom ring or the like that can be operated by a user. Zoom lens drive unit 211 transmits the user's operation to zoom lens 210, and moves zoom lens 210 along an optical axis direction of the optical system.

Focus lens 230 is a lens for changing a focus state of the subject image on CMOS sensor 110 formed in the optical system. Focus lens 230 is configured with one or more lenses.

Focus lens drive unit 233 includes a motor, and moves focus lens 230 along the optical axis of the optical system based on control by lens controller 240. Focus lens drive unit 233 can be realized by a DC motor, the stepping motor, a servo motor, the ultrasonic motor, or the like.

OIS lens 220 is a lens for correcting a blur of the subject image formed in the optical system of interchangeable lens 200 in the OIS function (the function of correcting the camera shake by shifting OIS lens 220). OIS lens 220 moves in a direction of canceling the shake of digital camera 1, thereby reducing the blur of the subject image on CMOS sensor 110. OIS lens 220 is configured with one or more lenses. OIS processor 223 controls OIS drive unit 221 based on an output of position sensor 222 and an output of shake detection unit 29 (a shake detector). OIS drive unit 221 receives control from OIS processor 223, and shifts OIS lens 220 in the plane vertical to the optical axis of the optical system.

OIS drive unit 221 can be realized, for example, by the magnet and the flat coil. Position sensor 222 is a sensor that detects a position of OIS lens 220 in the plane vertical to the optical axis of the optical system. Position sensor 222 can be realized, for example, by the magnet and the Hall element.

In shake detection unit 29 and shake detection unit 30, the internal gyro sensor detects a shake (a vibration) in a rolling direction, a yawing direction, and a pitching direction based on an angular variation per unit time, i.e., an angular velocity, of the digital camera. Further, in shake detection unit 29 and shake detection unit 30, an internal acceleration sensor detects a translational shake in the X direction and a translational shake in the Y direction (a vibration) based on a velocity variation per unit time, i.e., acceleration, of the digital camera.

Shake detection unit 29 outputs an angular velocity signal indicating an amount of the shake (the angular velocity) detected by the gyro sensor to OIS processor 223. Shake detection unit 30 outputs an acceleration signal indicating an amount of the shake (the acceleration) detected by the acceleration sensor to BIS processor 183. The angular velocity signal output from shake detection unit 29 and the acceleration signal output from shake detection unit 30 can include a wide range of frequency components caused by a camera shake, a mechanical noise, or the like.

1-4. ARRANGEMENT AND INTERNAL CONFIGURATION OF SHAKE DETECTION UNIT

Figure 4:
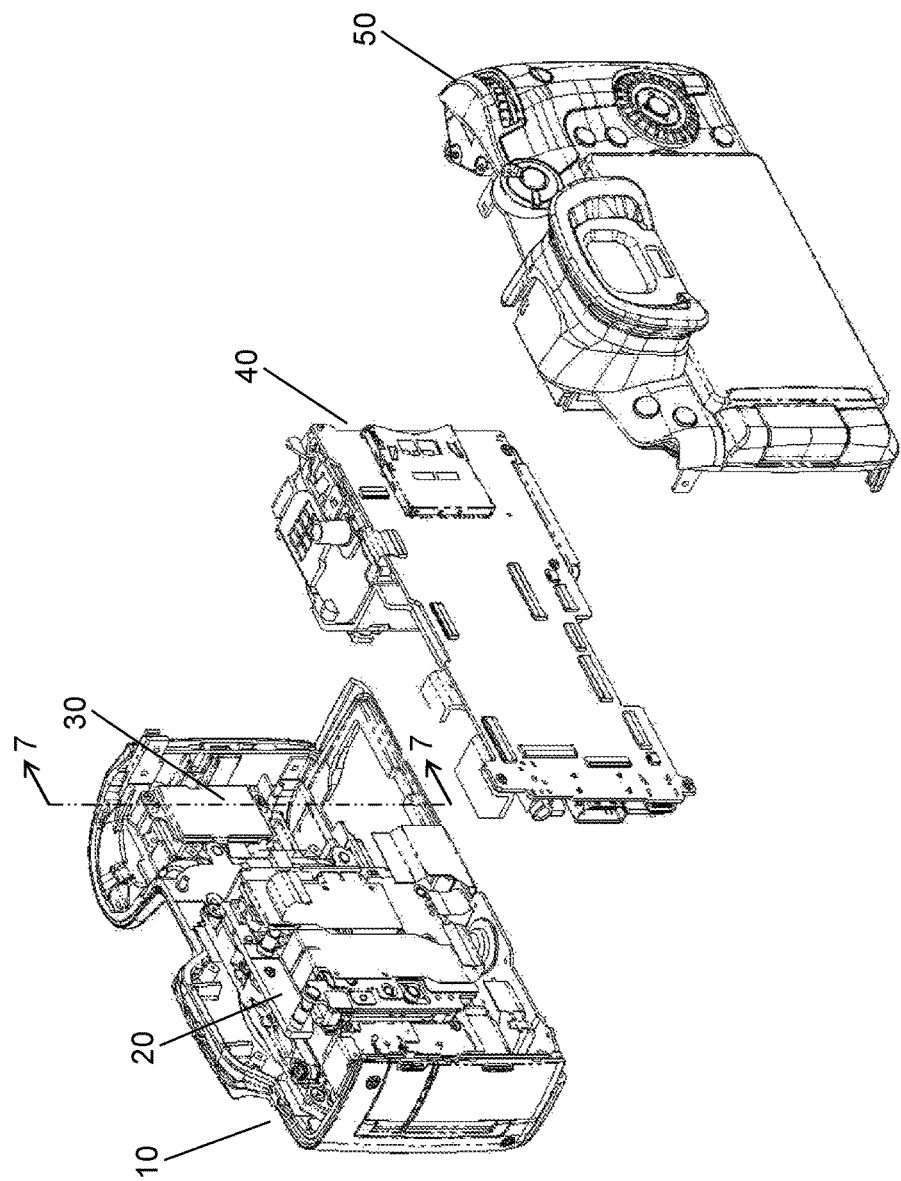
FIG. 4 is a partial developed perspective view of main components that configure the digital camera according to the first exemplary embodiment.

Next, arrangement of the shake detection unit in the digital camera is described. FIG. 4 is a partial developed perspective view of main components that configure the digital camera according to the first exemplary embodiment.

In FIG. 4, front unit 10, printed circuit board (PCB) unit 40, and rear unit 50 are shown as the main components that configure the digital camera. It should be noted that a top unit and the like are omitted in FIG. 4. Front unit 10 is mounted with imaging unit 20 and shake detection unit 30.

Shake detection unit 30 has the three gyro sensors and the one acceleration sensor, which will be described below. Shake detection unit 30 detects various kinds of shakes of camera body 100 (the shakes due to the rotations (ROLL, PITCH, YAW) around the three rotation axes and the shakes translated to the two axes of the X axis and the Y axis shown in FIG. 2). Shake detection unit 30 is disposed in a camera grip of front unit 10.

In order to reduce a shift in mounting inclination between shake detection unit 30 and the imaging sensor (CMOS sensor 110 in FIG. 3), it is preferable that shake detection unit 30 be mounted on a unit mounted with imaging unit 20 (front unit 10 in the present exemplary embodiment).

Figure 5:
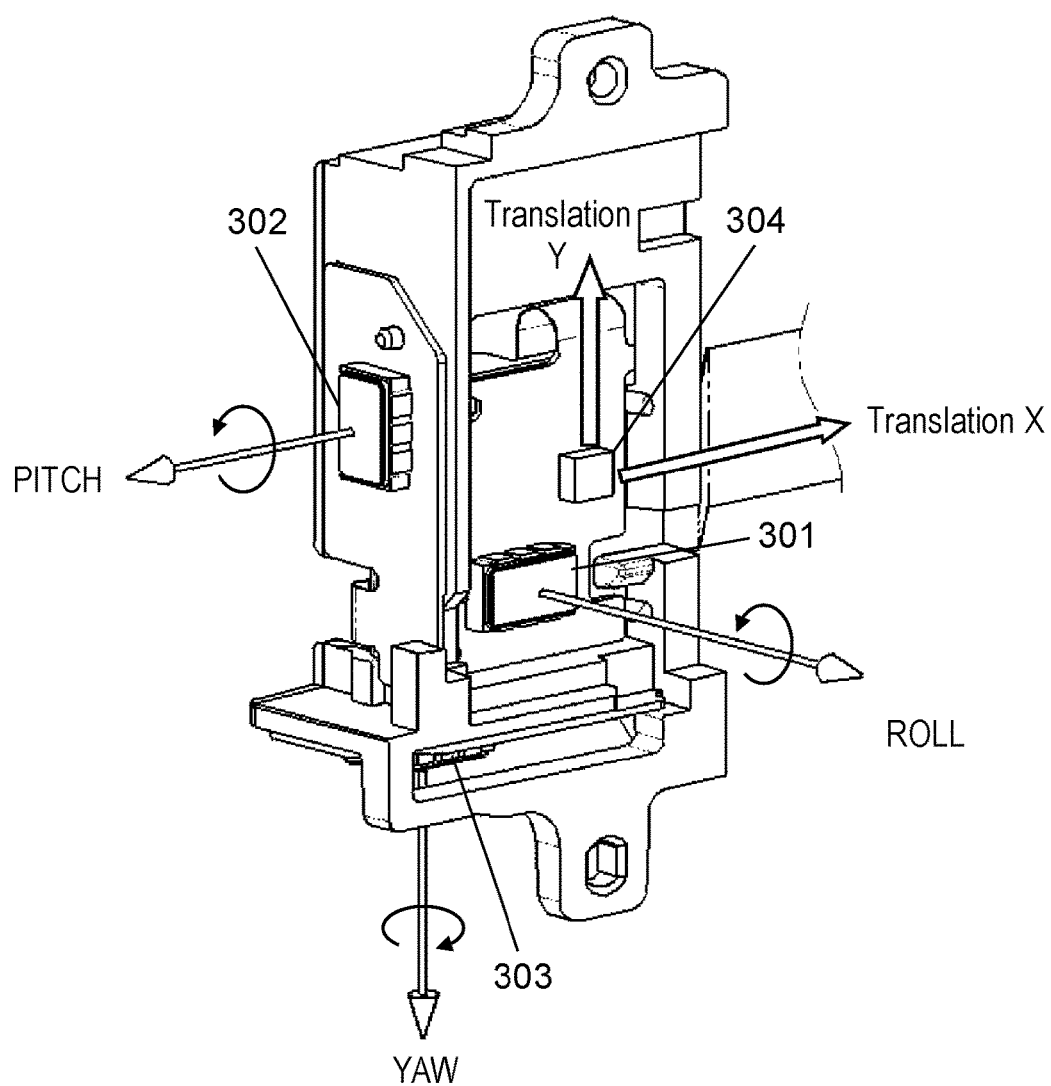
FIG. 5 is a perspective view showing an internal configuration of a shake detection unit.

FIG. 5 is a perspective view showing an internal configuration of the shake detection unit. Shake detection unit 30 has gyro sensor 301 (a first gyro sensor), gyro sensor 302 (a second gyro sensor), and a gyro sensor 303 (a third gyro sensor) disposed at mutually orthogonal positions. Gyro sensor 301 to gyro sensor 303 are respectively disposed on three planes orthogonal to the ROLL axis, the PITCH axis, and the YAW axis to detect the shake with high accuracy. Specifically, gyro sensor 301 for detecting ROLL rotation is disposed on the plane orthogonal to the ROLL axis. Gyro sensor 302 for detecting PITCH rotation is disposed on the plane orthogonal to the PITCH axis. Gyro sensor 303 for detecting YAW rotation is disposed on the plane orthogonal to the YAW axis. Further, shake detection unit 30 includes acceleration sensor 304 for detecting translational shake in the XY directions.

In order to dispose gyro sensor 301 to gyro sensor 303 on the three orthogonal planes inexpensively and with high accuracy, it is preferable that shake detection unit 30 be configured by using a holder formed of a resin molded member. It should be noted that shake detection unit 30 may be configured with a holder formed by cutting resin or metal.

1-5. HOLDING CONFIGURATION OF SHAKE DETECTION UNIT

Figure 6:
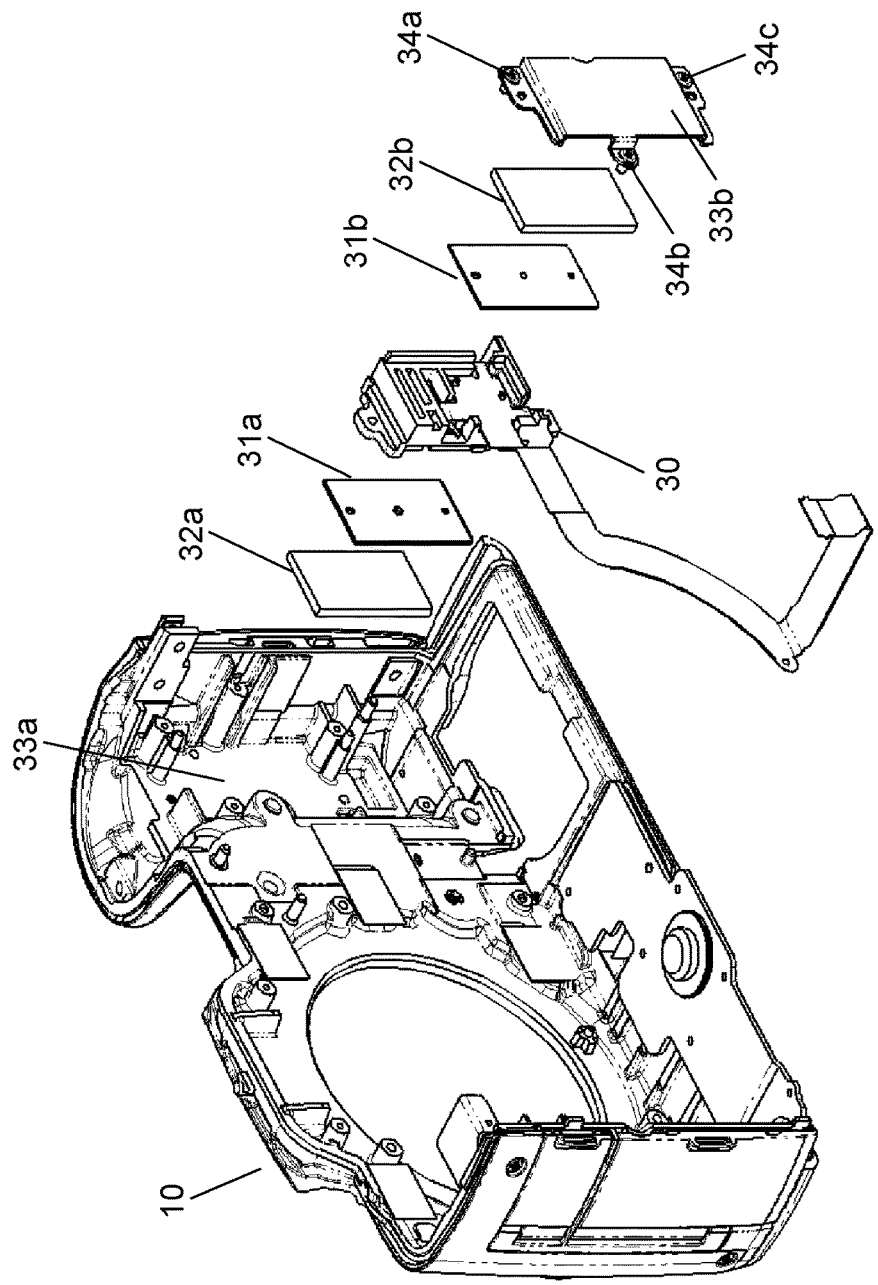
FIG. 6 is an exploded view showing a holding configuration of the shake detection unit according to the first exemplary embodiment.
Figure 7:
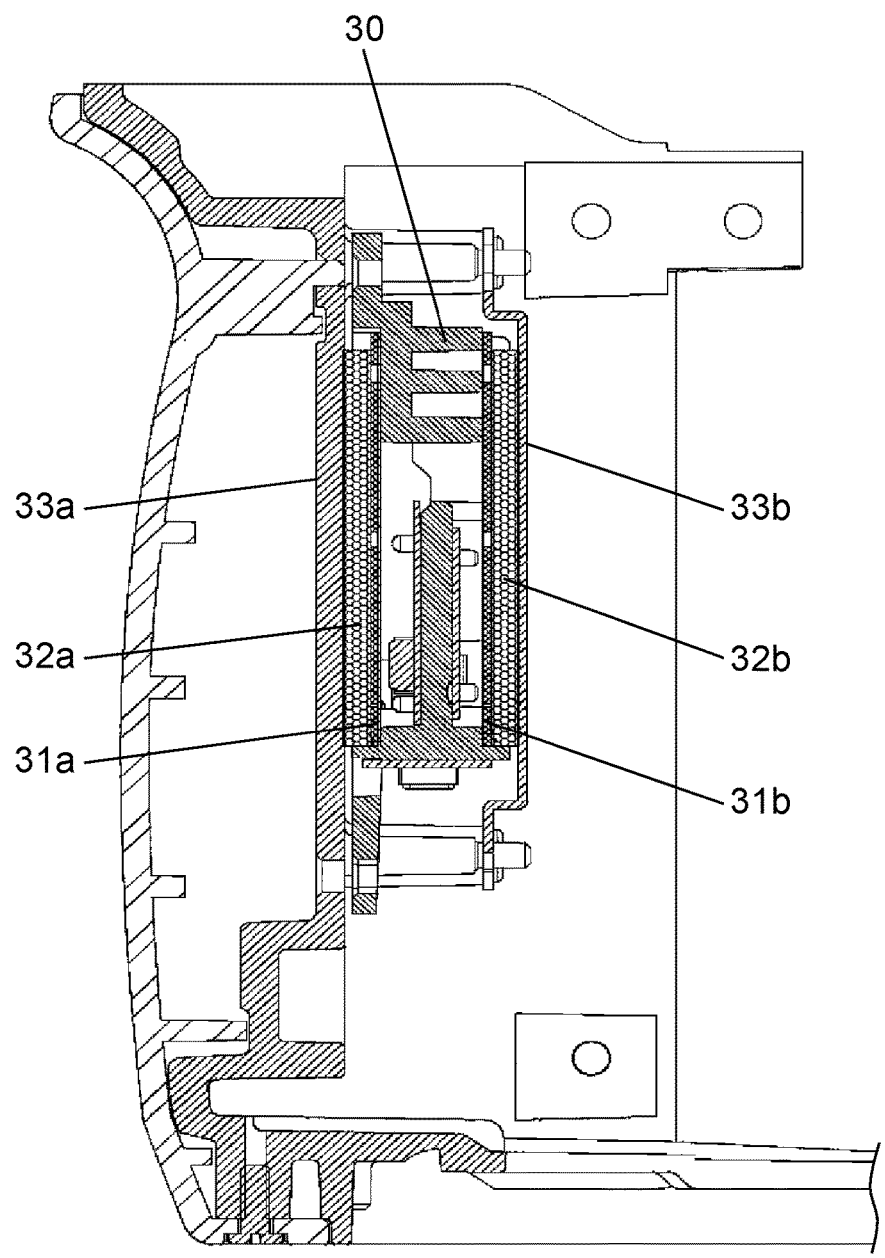
FIG. 7 is a sectional view showing the holding configuration of the shake detection unit according to the first exemplary embodiment.

Next, a holding configuration of shake detection unit 30 of the digital camera is described. FIG. 6 is an exploded view showing the holding configuration of shake detection unit 30 according to the first exemplary embodiment. FIG. 7 is a sectional view showing the holding configuration of shake detection unit 30 according to the first exemplary embodiment. The sectional view in FIG. 7 shows a section obtained by taking along a line 7-7 in FIG. 4.

Generally, a shock during running of the focal plane shutter (a shutter curtain unit), a vibration of the focus lens during AF drive, or the like is applied to a single lens camera. When this sort of shock or vibration occurred inside the digital camera is applied to the gyro sensor and the acceleration sensor, it is highly possible that the gyro sensor and the acceleration sensor erroneously detect the shock or the vibration as a camera shake of the digital camera. Correction means for correcting the camera shake performs correction according to the output of the gyro sensor or the acceleration sensor. Accordingly, when the erroneous detection occurs, the blur of the subject image to be imaged may be amplified without being subjected to accurate correction.

Moreover, when shake detection unit 30 is mounted obliquely, gyro sensor 301 to gyro sensor 303 detect rotations around the mutually different rotation axes (the ROLL axis, the PITCH axis, and the YAW axis). Accordingly, it is difficult to correct the camera shake with high accuracy.

Therefore, in the present exemplary embodiment, the holding configuration of shake detection unit 30 as described below is provided. In other words, while the mounting inclination of shake detection unit 30 is suppressed, the shock caused by the shutter curtains (for example, the front curtain and the rear curtain) or the vibration caused by the lens drive is hardly transmitted to the gyro sensors or the acceleration sensor.

First, shake detection unit 30 is sandwiched between cushion member 32a (a first cushion member) and cushion member 32b (a second cushion member) in a front and rear direction, thereby forming a floating configuration. In the present exemplary embodiment, a front direction of the front and rear direction is on a subject side, and a rear direction of the front and rear direction is on an image surface side. The front and rear direction is an example of the two facing directions. With such a configuration, the above-described vibration due to the disturbance, such as the shock, is hardly transmitted to shake detection unit 30. At that time, sheet metal 31a (a first sheet metal) is sandwiched between cushion member 32a and shake detection unit 30, and sheet metal 31b (a second sheet metal) is sandwiched between cushion member 32b and shake detection unit 30. Accordingly, loads from cushion member 32a and cushion member 32b are equally applied to shake detection unit 30. In other words, a front and rear of shake detection unit 30 is sandwiched between sheet metal 31a and sheet metal 31b, and sheet metal 31a and sheet metal 31b abut on cushion member 32a and cushion member 32b, respectively.

A material of cushion member 32a and cushion member 32b is a material having a shock/vibration absorbing property. For example, the material can be configured with SORBO (registered trademark) or the like manufactured by Sanshin Enterprises Co., Ltd. A material of sheet metal 31a and sheet metal 31b is stainless steel or the like with high rigidity. The material of sheet metal 31a and sheet metal 31b may be another material as long as a member has rigidity and is not deformed by repulsive force of cushion member 32a and cushion member 32b.

Further, higher-rigidity member 33a is disposed on a surface of cushion member 32a opposite to a surface that abuts on sheet metal 31a (a first surface). Higher-rigidity member 33b is disposed on a surface of cushion member 32b opposite to a surface that abuts on sheet metal 31b (a second surface). In this way, shake detection unit 30, sheet metal 31a and sheet metal 31b, and cushion member 32a and cushion member 32b are held by higher-rigidity member 33a and higher-rigidity member 33b, and are fixed to front unit 10 by screw 34a to screw 34c.

Figure 8:
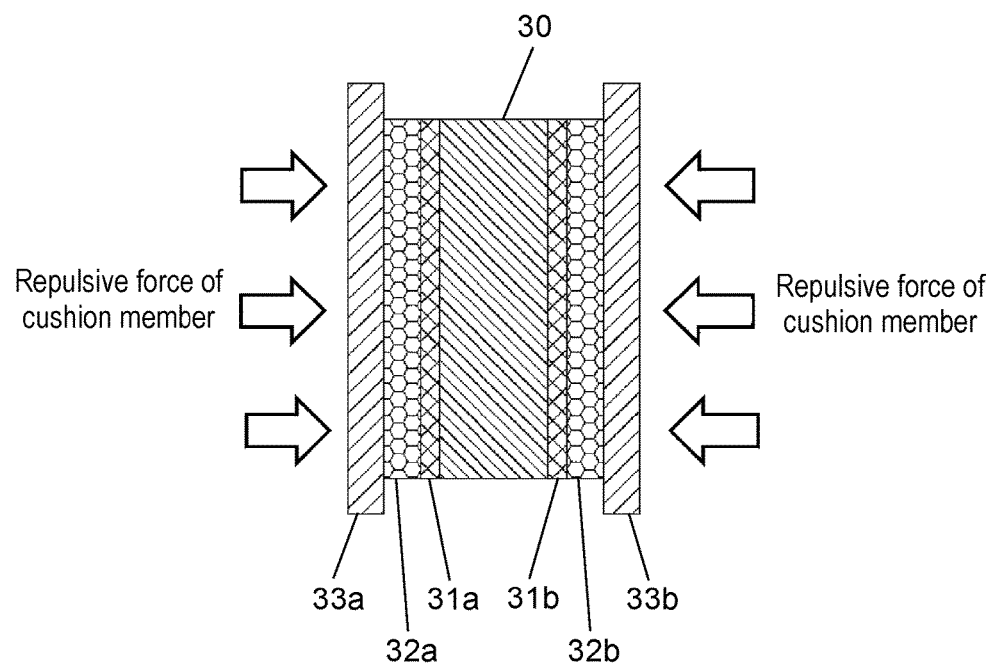
FIG. 8 is a schematic view showing the holding configuration of the shake detection unit in a case where flat surfaces of higher-rigidity members and flat surfaces of sheet metals respectively have areas larger than or equal to areas of flat surfaces of cushion members.

Hereinafter, the holding configuration of shake detection unit 30 in the present exemplary embodiment is described in detail with reference to FIG. 8. FIG. 8 is a schematic view showing the holding configuration of shake detection unit 30 in a case where flat surfaces of higher-rigidity member 33a and higher-rigidity member 33b and flat surfaces of sheet metal 31a and sheet metal 31b respectively have areas larger than or equal to areas of flat surfaces of cushion member 32a and cushion member 32b.

An area of the flat surface of cushion member 32a that faces sheet metal 31a and an area of the flat surface of cushion member 32b that faces sheet metal 31b are substantially equal.

Further, the flat surface of sheet metal 31a that faces cushion member 32a has an area larger than or equal to the area of the flat surface of cushion member 32a that faces sheet metal 31a. The flat surface of sheet metal 31b that faces cushion member 32b has an area larger than or equal to the area of the flat surface of cushion member 32b that faces sheet metal 31b.

Moreover, the flat surface of higher-rigidity member 33a that faces cushion member 32a has an area larger than or equal to an area of the flat surface of cushion member 32a that faces higher-rigidity member 33a (the first surface). The flat surface of higher-rigidity member 33b that faces cushion member 32b has an area larger than or equal to an area of the flat surface of cushion member 32b that faces higher-rigidity member 33b (the second surface).

As described above, in the present exemplary embodiment, the areas of the flat surfaces of sheet metal 31a and sheet metal 31b and of higher-rigidity member 33a and higher-rigidity member 33b that abut on cushion member 32a and cushion member 32b are larger than or equal to the areas of the flat surfaces of cushion member 32a and cushion member 32b. Accordingly, when cushion member 32a receives stress from outside via higher-rigidity member 33a, the stress applied to cushion member 32a is equally dispersed. Then, repulsive force caused by cushion member 32a is equally applied to shake detection unit 30 via sheet metal 31a. Similarly, when cushion member 32b receives stress from outside via higher-rigidity member 33b, the stress applied to cushion member 32b is equally dispersed. Then, repulsive force caused by cushion member 32b is equally applied to shake detection unit 30 via sheet metal 31b. Therefore, repulsive force caused by cushion member 32a and cushion member 32b in right and left directions can be almost equalized, and inclination of shake detection unit 30 is suppressed. In other words, in the present exemplary embodiment, the stress during mounting of shake detection unit 30 can be equally dispersed in both the right and left directions in FIG. 8, and the mounting inclination can be suppressed. Further, in the holding configuration in FIG. 8, stress during reception of a vibration due to a disturbance, such as a shutter shock, can be equally dispersed, and the stress can be absorbed by the cushion members. As a result, erroneous detection is suppressed, and a camera shake can be detected with high accuracy.

Figure 9A:
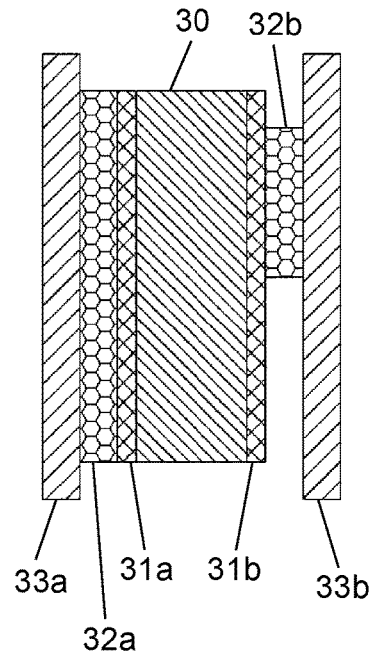
FIG. 9A is a schematic view showing a holding configuration of the shake detection unit in a case where areas of the flat surfaces of the two cushion members that sandwich the shake detection unit are not equal.
Figure 9B:
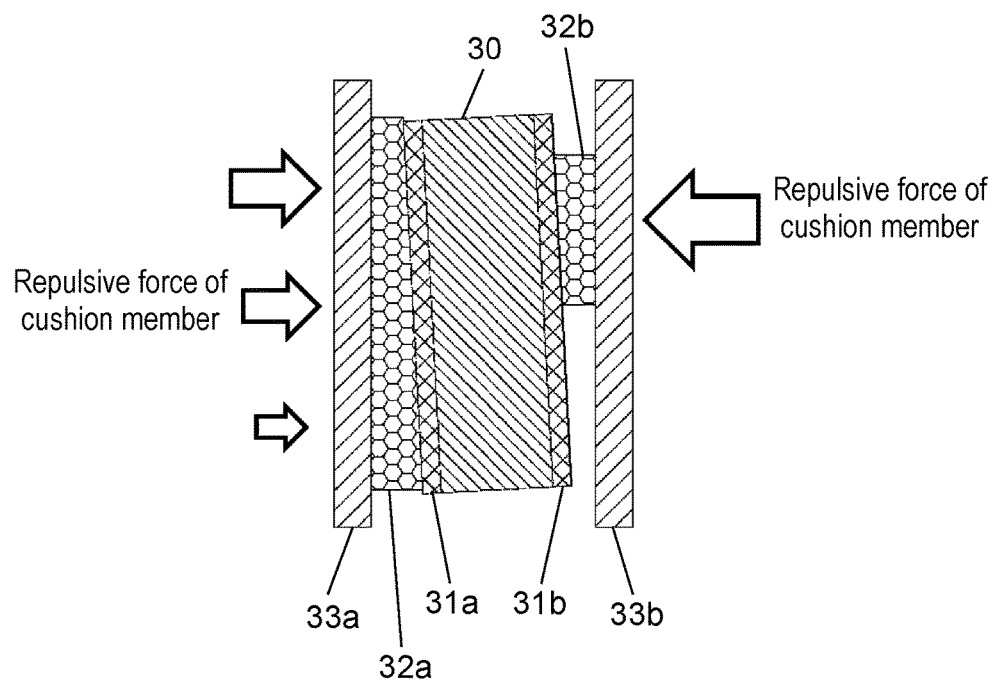
FIG. 9B is a schematic view showing the holding configuration of the shake detection unit in the case where the areas of the flat surfaces of the two cushion members that sandwich the shake detection unit are not equal.

FIGS. 9A and 9B are schematic views showing a holding configuration of shake detection unit 30 in a case where areas of the flat surfaces of cushion members 32a and 32b are not equal. FIG. 9A shows a state before shake detection unit 30 is fixed, and FIG. 9B shows a state after shake detection unit 30 is fixed.

If the area of the flat surface of cushion member 32a that faces sheet metal 31a and the area of the flat surface of cushion member 32b that faces sheet metal 31b are not equal, mutual repulsive force caused by cushion member 32a and cushion member 32b in the right and left directions cannot be equalized. Accordingly, when shake detection unit 30 is mounted, inclination occurs in shake detection unit 30. Further, when shake detection unit 30 receives the vibration due to the disturbance, such as the shutter shock, inclination occurs in shake detection unit 30. Therefore, it is desirable that the area of the flat surface of cushion member 32a that faces sheet metal 31a and the area of the flat surface of cushion member 32b that faces sheet metal 31b be substantially equal.

It should be noted that, while the mounting inclination of shake detection unit 30 is 0 degrees in the holding configuration in FIG. 8, the mounting inclination of shake detection unit 30 is 0.3 degrees in the holding configuration in FIG. 9B. Therefore, compared with the holding configuration in FIG. 9B, it is found that the holding configuration in FIG. 8 has little inclination during the mounting. In other words, it is considered that the holding configuration in FIG. 8 can improve detection accuracy of shake detection unit 30 more than the holding configuration in FIG. 9B. Further, while a maximum rotation angle (e.g., a Roll angle) detected during exposure is 0.0008 degrees or less in the holding configuration in FIG. 8, the maximum rotation angle is 0.0012 degrees in the holding configuration in FIG. 9B. Therefore, compared with the holding configuration in FIG. 9B, the holding configuration in FIG. 8 can equalize the repulsive force of cushion member 32a and the repulsive force of cushion member 32b during reception of the vibration due to the shutter shock, and can suppress the erroneous detection.

Figure 10A:
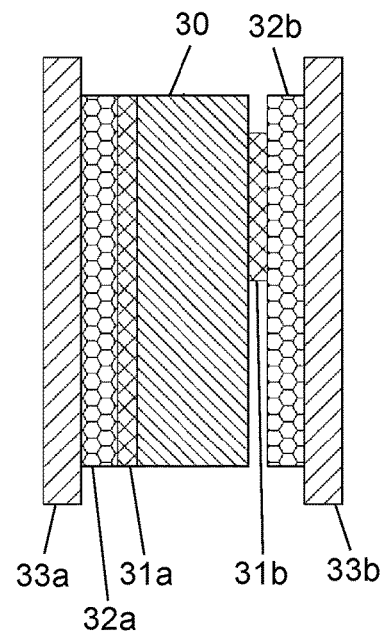
FIG. 10A is a schematic view showing a holding configuration of the shake detection unit in a case where one of the flat surfaces of the sheet metals does not have an area larger than or equal to the area of the flat surface of the cushion member.
Figure 10B:
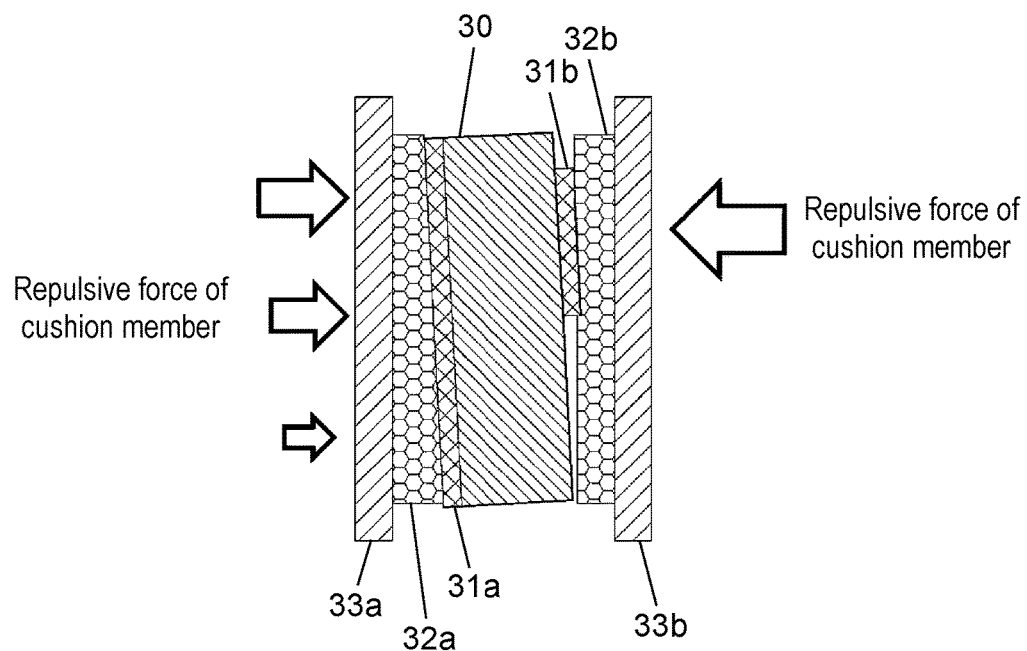
FIG. 10B is a schematic view showing the holding configuration of the shake detection unit in the case where one of the flat surfaces of the sheet metals does not have the area larger than or equal to the area of the flat surface of the cushion member.

FIGS. 10A and 10B are schematic views of shake detection unit 30 in a case where the flat surface of sheet metal 31b does not have an area larger than or equal to the area of the flat surface of cushion member 32b. FIG. 10A shows a state before shake detection unit 30 is fixed, and FIG. 10B shows a state after shake detection unit 30 is fixed.

If the area of the flat surface of sheet metal 31a that faces cushion member 32a and the area of the flat surface of sheet metal 31b that faces cushion member 32b are not equal, mutual repulsive force caused by cushion member 32a and cushion member 32b in the right and left directions cannot be equalized. Accordingly, when shake detection unit 30 is mounted, inclination occurs in shake detection unit 30. Further, when shake detection unit 30 receives the vibration due to the disturbance, such as the shutter shock, inclination occurs in shake detection unit 30. Therefore, it is desirable that the area of the flat surface of sheet metal 31a that faces cushion member 32a and the area of the flat surface of sheet metal 31b that faces cushion member 32b be substantially equal.

Further, it is desirable that the flat surface of sheet metal 31a that faces cushion member 32a have the area larger than or equal to the area of the flat surface of cushion member 32a that faces sheet metal 31a. Similarly, it is desirable that the area of the flat surface of sheet metal 31b that faces cushion member 32b have the area larger than or equal to the area of the flat surface of cushion member 32b that faces sheet metal 31b. Therefore, the repulsive force caused by cushion member 32a and cushion member 32b is equally propagated to entire shake detection unit 30 via sheet metal 31a and sheet metal 31b, and inclination of shake detection unit 30 can be suppressed.

1-6. CONCLUSION

As described above, in the present exemplary embodiment, the imaging device according to the present disclosure includes: shake detection unit 30 that holds gyro sensors 301 to 303 therein; sheet metal 31a and sheet metal 31b that sandwich shake detection unit 30 in the two facing directions; cushion member 32a that abuts on sheet metal 31a and faces shake detection unit 30 via sheet metal 31a; and cushion member 32b that abuts on sheet metal 31b and faces shake detection unit 30 via sheet metal 31b. A vibration due to a disturbance, such as a shutter shock, (a vibration other than a camera shake) is absorbed by cushion member 32a and cushion member 32b. In other words, it is possible to suppress a decrease in detection accuracy caused by erroneous detection of the vibration other than the camera shake as the camera shake. Moreover, repulsive force caused by cushion member 32a and cushion member 32b is equally propagated via sheet metal 31a and sheet metal 31b. Therefore, it is possible to suppress an inclination during mounting of shake detection unit 30 or an inclination during reception of the vibration due to the disturbance, such as the shutter shock.

Further, in the present exemplary embodiment, the area of the flat surface of cushion member 32a that faces sheet metal 31a and the area of the flat surface of cushion member 32b that faces sheet metal 31b are substantially equal. Accordingly, the repulsive force from cushion member 32a and cushion member 32b can be equalized, and the inclination of shake detection unit 30 can be suppressed. In other words, the mounting inclination can be suppressed. Further, when shake detection unit 30 receives the vibration due to the disturbance, such as the shutter shock, the inclination of shake detection unit 30 can be suppressed.

Further, in the present exemplary embodiment, the flat surface of sheet metal 31a that faces cushion member 32a has the area larger than or equal to the area of the flat surface of cushion member 32a that faces sheet metal 31a. Similarly, the flat surface of sheet metal 31b that faces cushion member 32b has the area larger than or equal to the area of the flat surface of cushion member 32b that faces sheet metal 31b. Accordingly, the repulsive force from cushion member 32a and cushion member 32b is equally propagated to shake detection unit 30 via sheet metal 31a and sheet metal 31b, and the inclination of shake detection unit 30 can be suppressed.

Further, in the present exemplary embodiment, the flat surface of higher-rigidity member 33a that faces cushion member 32a has the area larger than or equal to the area of the flat surface of cushion member 32a that faces higher-rigidity member 33a. Similarly, the flat surface of higher-rigidity member 33b that faces cushion member 32b has the area larger than or equal to the area of the flat surface of cushion member 32b that faces higher-rigidity member 33b. Accordingly, the stress from outside is equally propagated to a whole of cushion member 32a and cushion member 32b via higher-rigidity member 33a and higher-rigidity member 33b, and the inclination of shake detection unit 30 can be suppressed.

Further, shake detection unit 30 in the present exemplary embodiment includes gyro sensor 301 to gyro sensor 303. Accordingly, rotation shakes around the three rotation axes can be detected.

Further, shake detection unit 30 in the present exemplary embodiment has acceleration sensor 304 therein. In this case, the holding configuration of shake detection unit 30 in the present disclosure is similarly effective to holding of acceleration sensor 304.

Further, the imaging device in the present exemplary embodiment includes the interchangeable lens. Generally, focal plane shutter 113 having a large shutter shock is used for the imaging device provided with the interchangeable lens. Therefore, the holding configuration of shake detection unit 30 in the present exemplary embodiment is more effective.

The holding configuration of shake detection unit 30 is used according to the above-described present disclosure. Accordingly, even when gyro sensor 301 to gyro sensor 303 required to have high sensitivity levels and acceleration sensor 304 are used in the imaging device provided with the camera shake correction mechanism corresponding to the five axes, it is possible to suppress or solve a problem that the gyro sensors and the acceleration sensor erroneously detect the vibration other than the camera shake (the disturbance, such as the shutter shock) as the camera shake.

Other Exemplary Embodiments

As described above, the first exemplary embodiment is described as an implementation example of the present disclosure. However, the present disclosure is not limited to the first exemplary embodiment, and is applicable to any exemplary embodiment appropriately changed, replaced, added, or omitted.

Therefore, other exemplary embodiments are summarized below.

In the first exemplary embodiment, the imaging sensor provided in camera body 100 is the CMOS sensor. However, another imaging sensor, such as a charge coupled device sensor, may be used.

In the present exemplary embodiment, the gyro sensor is used as the angular velocity detection means. However, another sensor can be used instead of the gyro sensor as long as the sensor can detect the shake of the digital camera.

In the first exemplary embodiment, focal plane shutter 113 is used. However, it does not matter whether the shutter is a mechanical shutter (a high shock shutter) or an electromagnetic shutter (a low shock shutter). Further, in the holding configuration of shake detection unit 30 in the present disclosure, the shutter may be electronized. In this case, it is also effective to cut transmission of the vibration of the lens during the AF drive or the like to the gyro sensor.

In the first exemplary embodiment, the configuration of the digital camera that has shake detection unit 29 and shake detection unit 30 is described. However, the OIS function using shake detection unit 29 or the like may not be provided within interchangeable lens 200.

In the first exemplary embodiment, it is described that shake detection unit 30 within camera body 100 has acceleration sensor 304. However, shake detection unit 30 may not include acceleration sensor 304 as long as the five-axis correction is not performed and the three-axis correction is performed as the BIS function.

In the first exemplary embodiment, it is described that shake detection unit 29 within interchangeable lens 200 has the acceleration sensor. In a case where interchangeable lens 200 is a macro lens, it is desirable that shake detection unit 29 have the acceleration sensor therein. However, shake detection unit 29 mounted on interchangeable lens 200 other than the macro lens may not have the acceleration sensor therein.

In the first exemplary embodiment, the direction in which shake detection unit 30 is sandwiched by sheet metal 31a and sheet metal 31b, or the like is the front and rear direction (a Z axis direction in FIG. 2). However, the sandwiching direction is not limited to the front and rear direction. For example, the direction in which shake detection unit 30 is sandwiched by sheet metal 31a and sheet metal 31b, or the like may be an up and down direction (a Y axis direction in FIG. 2) depending on an arrangement place or an arrangement direction of shake detection unit 30.

The present disclosure is applicable to an imaging device with a camera shake correction function that mounts a shake detection unit. Specifically, the present disclosure is applicable to a digital still camera, a movie camera, a cell phone with a camera function, a smart phone, or the like provided with a camera shake correction function.

What is claimed is:

1. An imaging device comprising:
a shake detection holder that holds a gyro sensor;
a first sheet metal and a second sheet metal that sandwich the shake detection holder in two facing directions;
a first cushion member that abuts on the first sheet metal and faces the shake detection holder via the first sheet metal; and
a second cushion member that abuts on the second sheet metal and faces the shake detection holder via the second sheet metal, wherein
the first sheet metal does not abut on the second cushion member, and
the second sheet metal does not abut on the first cushion member.

2. The imaging device according to claim 1, wherein
an area of a flat surface of the first cushion member that faces the first sheet metal is substantially equal to an area of a flat surface of the second cushion member that faces the second sheet metal.

3. The imaging device according to claim 1, wherein
a flat surface of the first sheet metal that faces the first cushion member has an area larger than or equal to an area of a flat surface of the first cushion member that faces the first sheet metal, and
a flat surface of the second sheet metal that faces the second cushion member has an area larger than or equal to an area of a flat surface of the second cushion member that faces the second sheet metal.

4. The imaging device according to claim 1, further comprising:
a first higher-rigidity member disposed on a first surface of the first cushion member opposite to a surface of the first cushion member that abuts on the first sheet metal; and
a second higher-rigidity member disposed on a second surface of the second cushion member opposite to a surface of the second cushion member that abuts on the second sheet metal,
wherein
the shake detection holder is held in an electronic device by the first higher-rigidity member and the second higher-rigidity member,
a flat surface of the first higher-rigidity member that faces the first cushion member has an area larger than or equal to an area of the first surface, and
a flat surface of the second higher-rigidity member that faces the second cushion member has an area larger than or equal to an area of the second surface.

5. The imaging device according to claim 1, wherein
the gyro sensor includes a first gyro sensor, a second gyro sensor, and a third gyro sensor disposed at mutually orthogonal positions.

6. The imaging device according to claim 1, wherein
the shake detection holder has an acceleration sensor.

7. The imaging device according to claim 1, further comprising an interchangeable lens.

* * * * *